United States Patent [19]

Gluck

[11] 4,249,111

[45] Feb. 3, 1981

[54] AUTOMATIC LAMP SHUTDOWN CIRCUIT

[75] Inventor: Julius Gluck, Norwalk, Conn.

[73] Assignee: Pitney Bowes Inc., Stamford, Conn.

[21] Appl. No.: 67,861

[22] Filed: Aug. 20, 1979

[51] Int. Cl.³ .................... H05B 37/00; G03B 27/72
[52] U.S. Cl. .................................. 315/360; 315/307;
355/69
[58] Field of Search ............... 315/119, 307, 360, 362;
355/67, 69

[56] References Cited

U.S. PATENT DOCUMENTS

| | | | |
|---|---|---|---|
| 3,600,610 | 8/1971 | Kelsch et al. ...................... 355/69 X |
| 3,689,141 | 9/1972 | Gray ................................ 355/69 X |

FOREIGN PATENT DOCUMENTS 47-23583  6/1972  Japan ......................................... 355/69

*Primary Examiner*—Eugene R. LaRoche
*Attorney, Agent, or Firm*—Lawrence E. Sklar; William D. Soltow, Jr.; Albert W. Scribner

[57] ABSTRACT

An automatic lamp shutdown circuit, which comprises a lamp, a line-voltage compensation control circuit for the lamp, and an automatic shutdown circuit operatively connected to the line-voltage compensation control circuit for turning the lamp off after the lamp has been on for a pre-determined amount of time.

6 Claims, 2 Drawing Figures

AUTOMATIC LAMP SHUTDOWN CIRCUIT

BACKGROUND OF THE INVENTION

The instant invention relates to a circuit for automatically shutting down a lamp and more particularly to such a circuit which automatically shuts down the lamp in an electrophotocopying machine after the lamp has been on for a predetermined amount of time.

In facsimile systems or in office copy machines, it is customary to have relative motion between an original document and a source of scanning rays. The scanning rays are scanned in some predetermined fashion across the document for subsequent utilization thereof, i.e., transmission or recreation of the original document. The brighter the image scanning rays become the more responsive and selective may be the detection system. With a low powered source of image scanning rays, the detection system must of necessity be more sensitive, which inherently adds noise or other undesirable effects to the output signal therefrom.

It is therefore desirable to use as high an energy exposure lamp as is possible without causing damage to the original document or the glass platen supporting the original document. Such a high powered source of rays is desirable in that information detection becomes less complex with the additional advantage of higher resolution and information density. If, however, a paper jam occurs in the machine, whether a facsimile scanning device or office copying machine, the danger posed by the extreme heat radiated by the high energy exposure lamp increases. As an original document may be difficult to replace, it is highly desirable to deenergize the exposure lamp and/or the transport system as quickly as the jam is detected so as to prevent scorching, burning or tearing of the original document or damage to the glass platen.

One prior art solution to this situation is to continually monitor by mechanical means the movement of the document through the mechanical transport. Such a system is undesirable, however, as different size paper or torn or mutilated sheets may be used which render the mechanical detection device inoperative. If such a jam would occur with an unreliable jam detector, the possiblilty arises of the original document being destroyed due to the heat energy radiated by the high energy exposure lamp or tearing by continual movement of the transport system.

Another prior art solution is disclosed in U.S. Pat. No. 3,600,610, issued Aug. 17, 1971, which utilizes rollers and a cam to open and close a microswitch to thereby energize a timing circuit which allows the lamp to continuously illuminate the document. If the paper jams in any manner, the rollers stop since the paper itself is not moving through the rollers, and the cam is no longer able to operate the microswitch and after a predetermined time delay the timing circuit will deenergize the lamp. The rollers and cam are in effect a sensing device, and the instant invention provides a circuit for deenergizing a lamp which does not require any sensing devices and utilizes fewer components than any of the prior art solutions.

SUMMARY OF THE INVENTION

Accordingly, the instant invention provides an automatic lamp shutdown circuit, which comprises a lamp, a line-voltage compensation control circuit for the lamp, and an automatic shutdown circuit operatively connected to the line-voltage compensation control circuit for turning the lamp off after the lamp has been on for a pre-determined amount of time.

DETAILED DESCRIPTION

Figure 1:
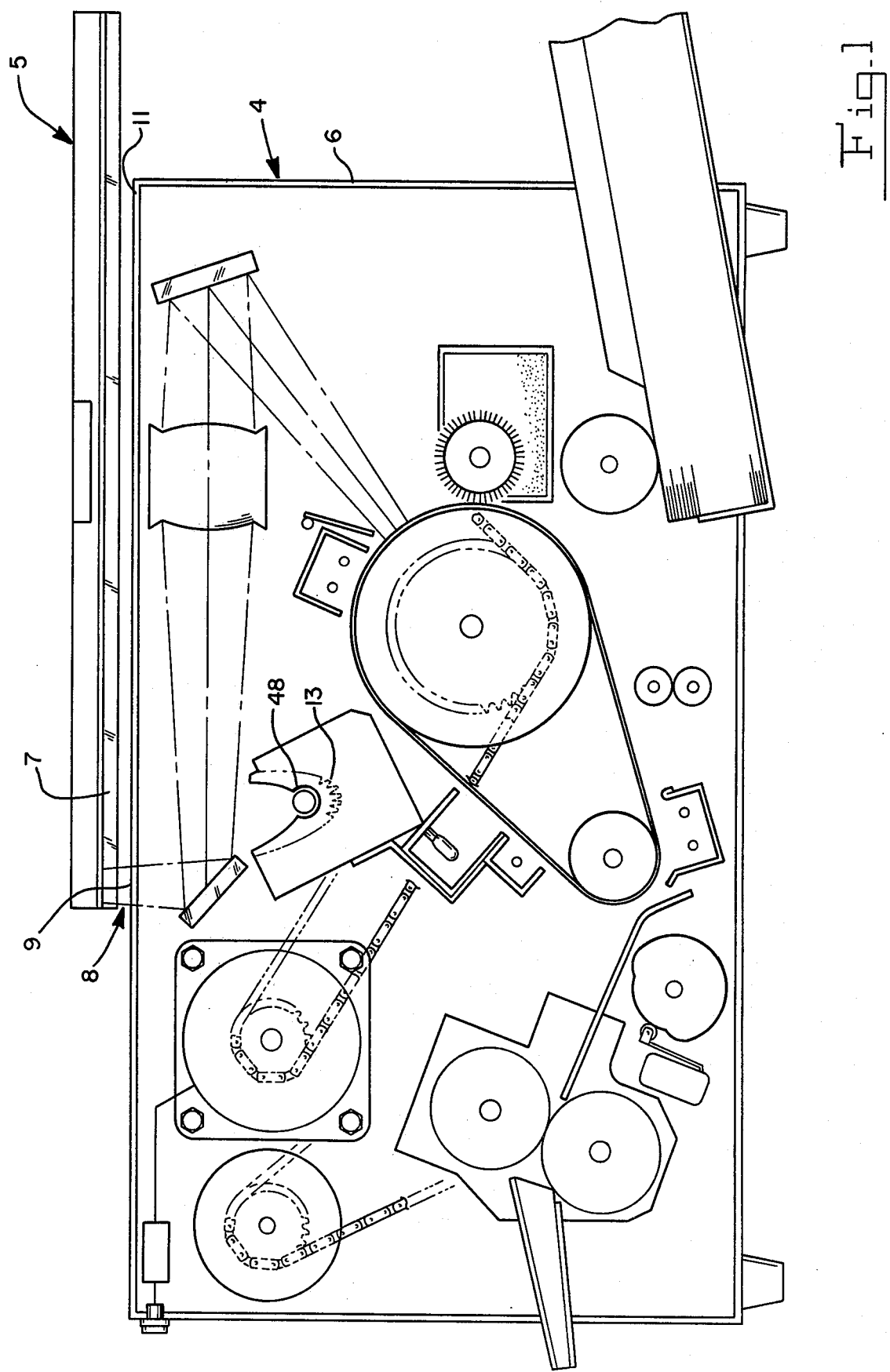
FIG. 1 is a schematic elevational view of an electrophotocopying machine incorporating an automatic lamp shutdown circuit in accordance with the instant invention.

In describing the preferred embodiment of the instant invention, reference is made to the drawings, wherein there is seen in FIG. 1 a compact, table top, plain paper electrophotocopying machine generally designated 4 having a reciprocating carriage 5 movably mounted on top of a cabinet 6. The carriage 5 includes a transparent platen 7 on which documents (not shown) are placed face down for copying.

An illuminating station, generally indicated at 8, includes a relatively narrow, transparent window 9 mounted on the upper surface 11 of the cabinet 6. The window 9 extends across the width of the upper surface 11. A light source is operatively disposed underneath the window 9, and comprises a lamp 48 partially surrounded by a shaped reflector 13 which serves to direct the light from the lamp 48 toward the window 9. The original document is scanned and copied in a manner well known to those skilled in the art. However, for a detailed discussion of the workings of the copier 4, reference is made to co-pending application Ser. No. 947,873 filed Sept. 28, 1978 by the same assignee as the instant invention.

Figure 2:
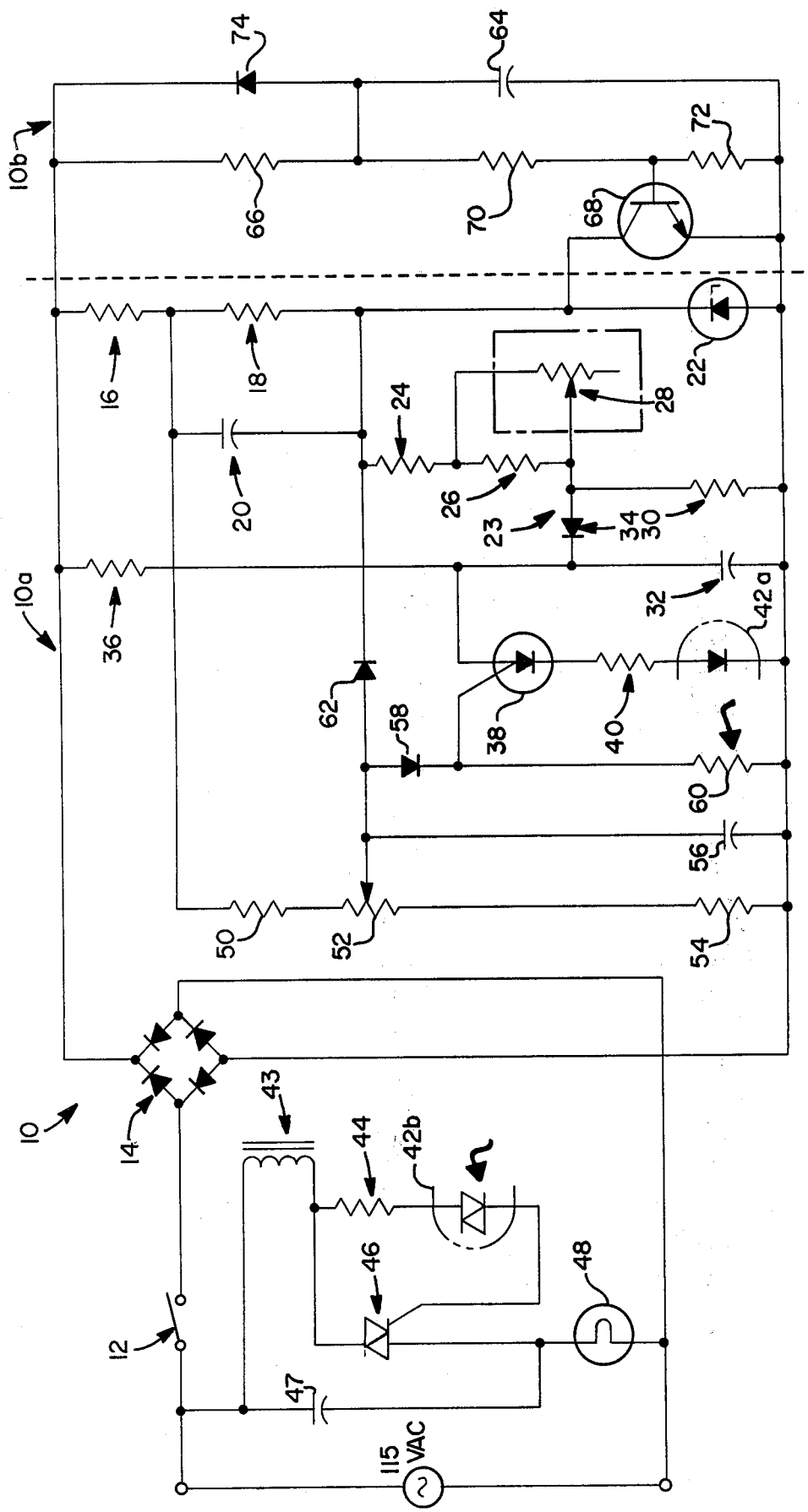
FIG. 2 is a schematic diagram of the automatic lamp shutdown circuit according to the instant invention.

The automatic shutdown circuit for the lamp 48 is generally designated 10, and includes a line voltage compensation control circuit 10a and an automatic shutdown circuit 10b, the two circuits being shown in FIG. 2 and separated by the vertical, dashed line. The line voltage compensation control circuit 10a will be described for a 115 volt A.C. input, although several other voltage inputs may be used, which would obviously necessitate minor changes in the circuit 10.

The control circuit 10a includes an exposure lamp switch 12 which is indirectly controlled by the print switch (not shown) on the control panel (not shown) of the copier 4, and a rectifier bridge 14 consisting of four (4) diodes. The rectified voltage passes through a 10 k ohm resistor 16, a parallel combination of a 1.5 k ohm resistor 18 and a 47 uf capacitor 20, and a 20 volt zener diode 22. The voltage derived from the zener diode 22 drives a voltage divider 23 consisting of four resistors, which are a 5.6 k ohm resistor 24, a 4.7 k ohm resistor 26, a 2.5 k ohm variable resistor 28, and an 8.2 k ohm resistor 30. The variable resistor 28 is the voltage control element for the lamp 48 and is connected to a knob (not shown) on the control panel (not shown) of the copier 4 which is adjusted by the operator to provide greater or lesser lamp intensity to produce, respectively, a lighter or darker copy. The voltage divider 23 thus provides the desired voltage to pre-charge a 0.1 uf capacitor 32 through a diode 34.

A 1.54 M ohm resistor 36 is provided to superimpose a voltage ramp on the capacitor 32, whereby when the programmable unijunction transistor (PUT) 38 threshold voltage is reached, the PUT 38 discharges the capacitor 32 through a 270 ohm resistor 40 which is connected in series with an optical triac 42a input. The discharge through the optical triac 42a input turns on optical triac 42b which then permits current to flow through a 100 uh inductor 43 and a 390 ohm resistor 44 into the gate of the main triac 46. The gate current of the main triac 46 activates the main triac 46 which is turn permits the line voltage to be applied to the lamp 48. Capacitor 47 acts as a noise filter.

The PUT 38 threshold voltage is derived from the combination of the zener diode 22 voltage and the rectified and filtered line voltage across the capacitor 20. The combination voltage of the zener diode 22 and the capacitor 20 is divided through an 8.2 k ohm resistor 50, a 2 k ohm potentiometer 52 and a 6.2 k ohm resistor 54. A 0.047 uf capacitor 56 acts as a noise filter. The divided voltage is then fed to the gate electrode of the PUT 38 through a diode 58 and a resistor 60 which shunt the gate of the PUT 38. A diode 62 prevents spurious firing of the PUT 38 which in turn prevents the main triac 46 from spurious firing.

DC voltage is applied to the automatic shutdown circuit 10b, upon activation of switch 12, through the bridge rectifier 14. A 3.3 uf capacitor 64 will start charging up through a 10 M ohm resistor 66. If the exposure switch 12 is not normally deenergized, then the capacitor 64 will charge to 7 volts, at which point a Darlington transistor 68 (a composite configuration of transistors which provides a high input impedance and a high degree of amplification) is turned on and shorts out the zener diode 22 and thereby prevents triggering of the PUT 38. The turn-on time is determined by a 1 M ohm resistor 70, a 200 k ohm resistor 72, the capacitor 64 and the resistor 66. A diode 74 serves to discharge the capacitor 64 quickly upon opening the switch 12 so that if the next switch closure follows immediately, the capacitor 64 will have been discharged and delay time is not affected.

While this invention has been described with reference to the structure disclosed herein, it is not confined to the details set forth and this application is intended to cover modifications and changes which may come within the scope of the following claims.

What is claimed is:

1. In an electrophotocopying machine having a reciprocating carriage for supporting original documents to be copied, a lamp for illuminating said original documents, an automatic lamp shutdown circuit, comprising:
   a line-voltage compensation control circuit for said lamp, said control circuit including a voltage source; and
   an automatic shutdown circuit operatively connected to said voltage source for turning the lamp off after the lamp has been on for a pre-determined amount of time.

2. The circuit of claim 1, wherein the automatic shutdown circuit comprises a timer and a switch activated by the timer for shorting out the voltage source.

3. The circuit of claim 2, wherein the timer comprises a network of resistors and operatively connected capacitors.

4. The circuit of claim 3, wherein the switch is a Darlington transistor.

5. The circuit of claim 4, wherein the timer consists of a first resistor operatively connected to the voltage source, a timing capacitor connected in series to said first resistor, and a voltage divider connected in parallel with said capacitor, and wherein the output of said voltage divider drives the base emitter of the Darlington transistor.

6. The circuit of claim 5, wherein the voltage divider comprises a pair of resistors.

* * * * *